United States Patent [19]

Fairchild

[11] Patent Number: 4,722,494
[45] Date of Patent: Feb. 2, 1988

[54] CABLE RETRACTOR ASSEMBLY FOR TAKING UP SLACK OF A CABLE

[75] Inventor: Robert G. Fairchild, Santa Ana, Calif.
[73] Assignee: Odetics, Inc., Anaheim, Calif.
[21] Appl. No.: 920,026
[22] Filed: Oct. 17, 1986
[51] Int. Cl.⁴ .................... B65H 75/48; H01R 39/00
[52] U.S. Cl. ............................ 242/107.1; 191/12.2 R; 242/107.2; 439/4
[58] Field of Search ............. 242/107.1, 107 B, 100.1, 242/107.11, 107.12, 107.14, 107.15, 107.2; 339/2 A, 2 RL; 191/12.2 R

[56] References Cited

U.S. PATENT DOCUMENTS

| | | | |
|---|---|---|---|
| 1,944,264 | 1/1934 | Aravec | 191/12.2 R |
| 3,137,883 | 6/1964 | Descarries | 191/12.2 R X |
| 3,657,491 | 4/1972 | Ryder | 191/12.2 R |
| 3,763,455 | 10/1973 | Confer | 191/12.2 R X |
| 3,853,285 | 12/1974 | Woodring | 242/107.11 |
| 3,959,608 | 5/1976 | Finlayson | 191/12.2 R |

Primary Examiner—Stuart S. Levy
Assistant Examiner—Katherine Matecki
Attorney, Agent, or Firm—Spensley Horn Jubas & Lubitz

[57] ABSTRACT

A cable retractor assembly which utilizes a rotatable spool assembly for taking up slack in a cable connected between a mobile member and a stationary base member. The present invention makes use of a cable assembly which has first and second portions which are wound onto or unwound from the spool assembly at the same time to maintain a continuous cable connection between the members while avoiding loose cable in the open. A retraction assembly provide the retraction force to rotate the spool assembly to wind the slack cable.

15 Claims, 8 Drawing Figures

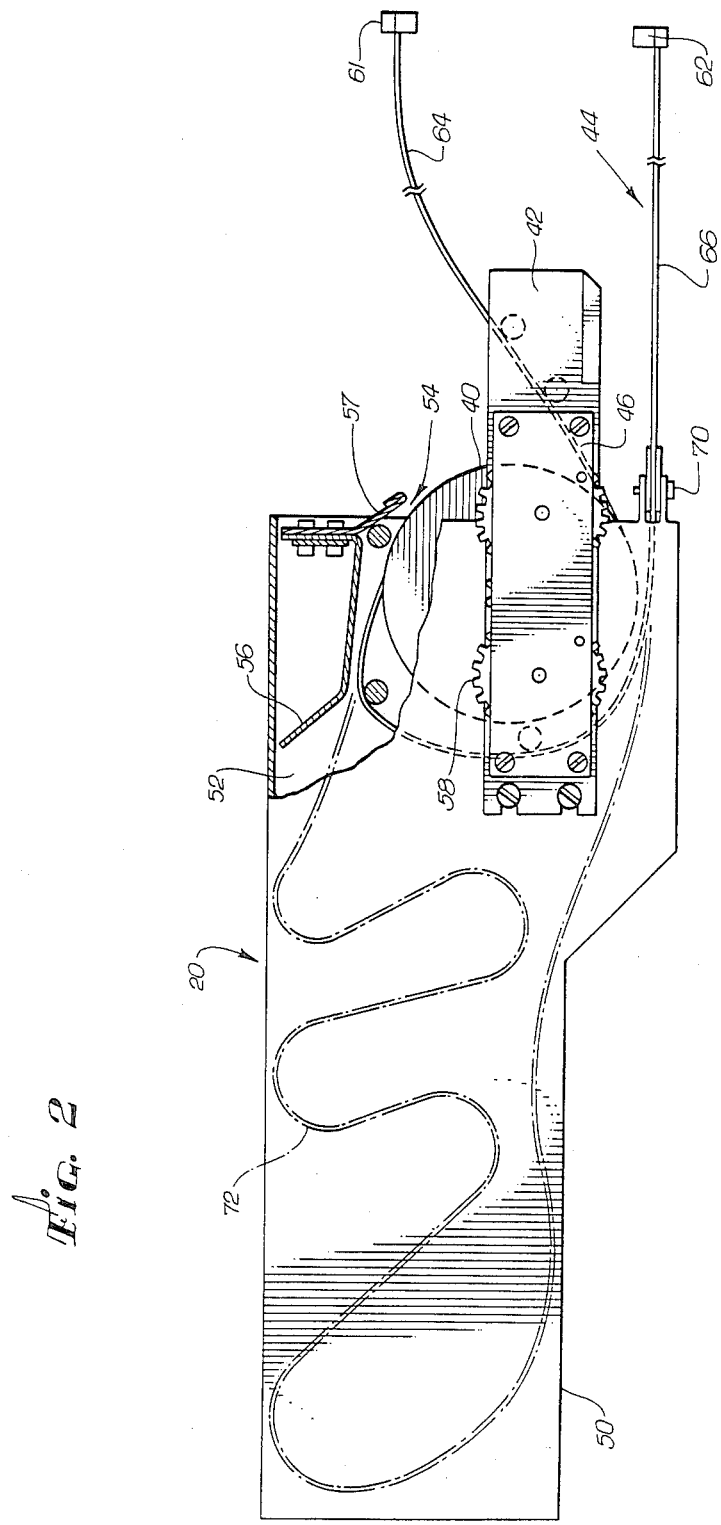

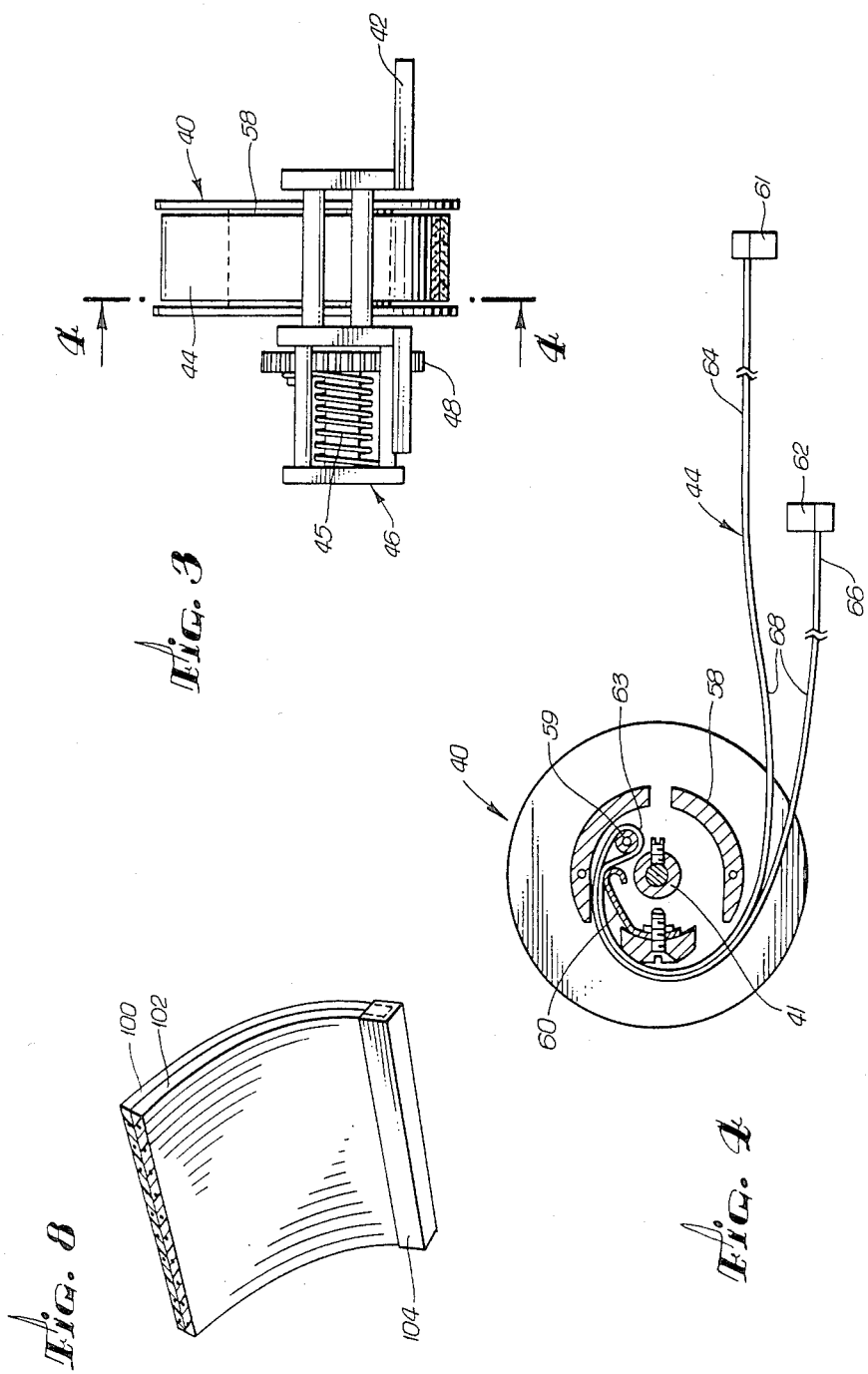

CABLE RETRACTOR ASSEMBLY FOR TAKING UP SLACK OF A CABLE

BACKGROUND OF THE INVENTION

1. Field of the Invention

The present invention relates to a cable retractor assembly and method for taking up slack of a flexible cable which is carrying power and/or data signals across a variable distance between a stationary base member and a mobile member and, more particularly, to a cable retractor assembly and a method which incorporates a spool assembly to maintain the flexible cable in a taut condition and two portions of cable to maintain continuous cable connection between the two members.

2. Description of the Prior Art

There is a need for managing variable length of excess flexible cable connected between two members wherein the distance between the members is variable. It is desirable to maintain the excess length of cable in a taut condition between the members. Otherwise, the slack cable may twist, flap or entangle with itself or with a nearby structure when the cable is caused to move with the mobile member.

The typical means for taking up the slack of a cable between a mobile member and a stationary base member is to utilize a cable of a elastic coiled configuration similar to that of a coil spring. A familiar example of a device in which such a coiled configuration is applied is the common telephone system, wherein a coil of cable is utilized between the handset and the main body of the telephone set. As the handset is moved away from the main body of the telephone, the cable coil is stretched accordingly. The cable coil retracts like a coil spring when the handset is returned to the hook on the telephone.

FIG. 1 shows a similar cable coil of the prior art configuration provided in a manipulator system to transmit power from the stationary power source to a mobile manipulator assembly. The manipulator system is described in detail in a copending U.S. patent application Ser. No. 06/720,577 filed on Apr. 8, 1985, now abandoned and refiled as continuing application Ser. No. 06/935,121. The manipulator assembly 10 driven by power from a remote power source 16 is movable vertically along a shaft 18 to thereby vary the distance between the manipulator assembly and the stationary power source. The cable coil 14 is elastic such as to allow for the movement of the manipulator assembly. As the cable coil contracts, it takes up slack in the cable connection between the manipulator assembly and the stationary source. If a straight length of cable is used instead of a coiled cable, then as the manipulator assembly moves downwards, the cable slackens and any subsequent motion of the manipulator assembly would create the possibility of entanglement of the cable with the nearby structure or entanglement with itself into a knot. Also, as the manipulator assembly moves along the shaft at high speed, the slack cable tends to flap under its inertia.

Although a coiled cable configuration is less prone to tangling than a flat cable, its use does not completely eliminate the problem. Furthermore, its benefits are somewhat offset by the fact that it may necessitate custom fabrication, i.e., a conventional ribbon-type multiconductor cable cannot be used.

SUMMARY OF THE INVENTION

It is an object of the present invention to provide a simple, compact and reliable cable retractor to neatly take up the slack of excess flexible cable while maintaining the necessary electrical connection. It is a further object of this invention to provide a cable retractor to maintain the flexible cable connection between the mobile member and the stationary base member in a taut condition. Yet another object of the invention is to provide a cable retractor to facilitate use with conventional ribbon cable.

These and other objects are achieved by providing a spool assembly and a cable assembly having two portions of cable attached to the spool. The first portion is coupled to the second portion at the spool to form a continuous signal line. The free end of the first portion is connected to the mobile member, and the free end of the second portion is conneced to the stationary base member. The second portion winds onto or unwinds from the spool at the same time as the first portion. The dual portion cable assembly is wound onto the spool, starting at the coupling of the two portions, to form alternate layers of first and second portions of cable around the spool. The spool is spring biased in the direction of rotation tending to effect winding of the cable portions.

Briefly, when the mobile member is being moved away from the spool, both cable portions are unwound from the spool as the first portion is pulled by the moving member thereby to cause the spool to rotate against the action of the spring bias. The unwound cable of the first portion is maintained taut between the mobile member and the spool by the spring acting on the spool in the direction which tends to rewind the cable onto the spool. The unwound cable of the second portion is free to accumulate in a housing chamber adjacent to and facing the spool. When the mobile member is being moved toward the spool, the first portion and the second portion are rewound onto the spool by the force of the spring. Thus, twisting, entanglement and flapping of the excess flexible cable is eliminated.

BRIEF DESCRIPTION OF THE DRAWINGS

FIG. 2 is a side plan view, partially broken away, of the present invention including a cable housing.

FIG. 3 is an end plan view of the spool assembly and the cable retraction means.

FIG. 4 is a cross-sectional view along section A—A of FIG. 3 showing the winding of the cable assembly onto the spool assembly.

FIG. 8 is a diagramatic view showing another embodiment of a cable assembly which may be used with the present invention.

DESCRIPTION OF THE PREFERRED EMBODIMENT

The following detailed description is of the best presently contemplated mode of carrying out the invention. This description is not to be taken in a limitinhg sense, but is made for the purpose of illustrating the general principles of the invention. The scope of the invention is best defined by the appended claims.

Figure 1:
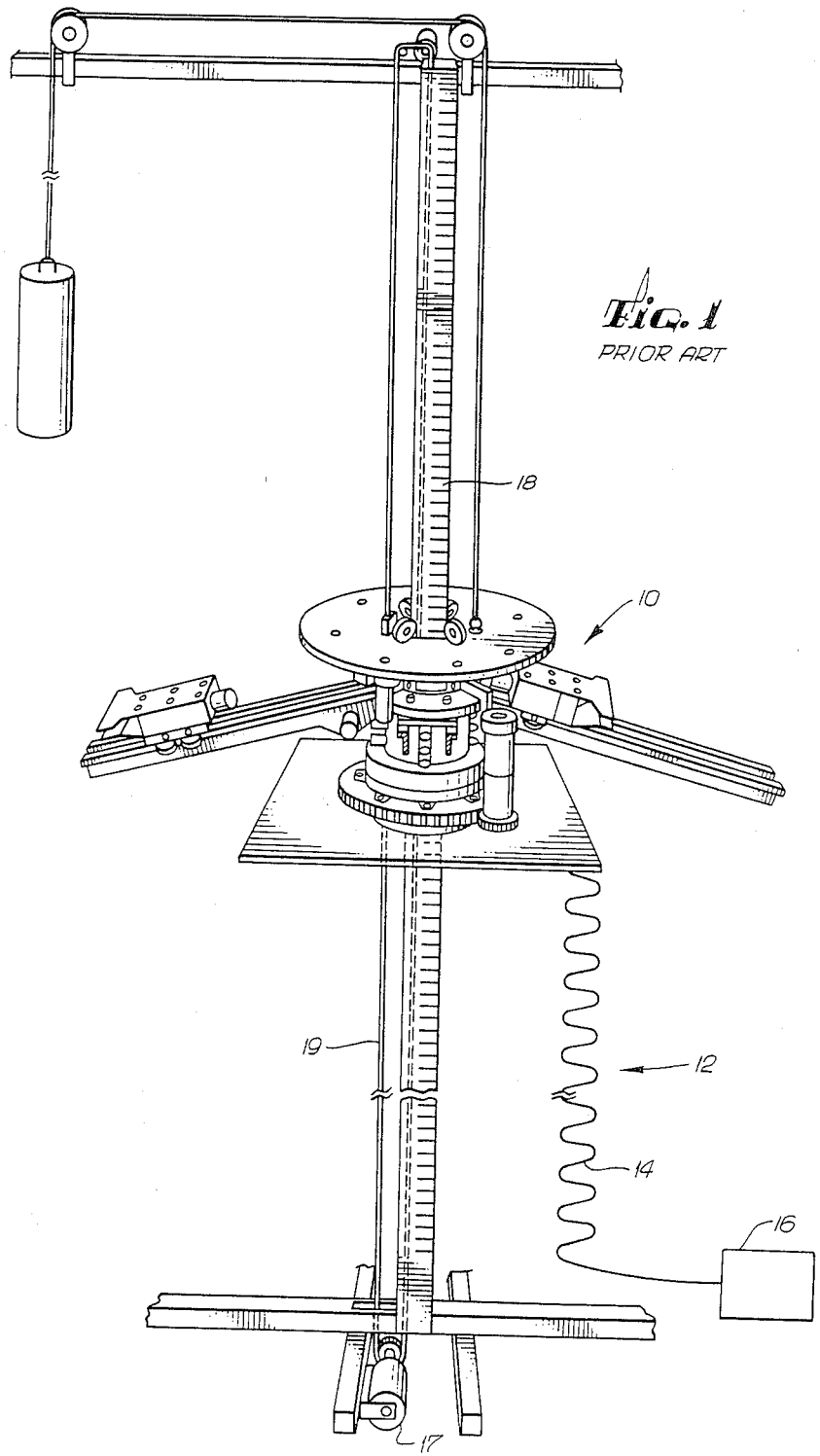
FIG. 1 is a front perspective diagramatic view showing an environment in which the present invention may be utilized and a prior art means for taking up slack of a cable.

FIG. 1 shows an example of an environment in which it is desirable to employ a cable retractor device to facilitate management of the excess length of power cable between a mobile member and a stationary base member. In this example, the mobile member is an article manipulator assembly 10 which is disclosed in detail in a copending U.S. patent application Ser. No. 06/720,577 filed on Apr. 8, 1985. The manipulator may be used, for example, to move videocassettes between storage locations and tape transports. The particular means 12 for taking up slack in a cable generally shown in the figure is a coiled cable 14. The cable 14 includes multiple conductors and carries both power and control signals to control the operation of the manipulator assembly 10. It is connected between the manipulator assembly 10 and a stationary power source 16 which supplies the power to the manipulator assembly. Control signals are provided by a computer or similar controller (not shown). The manipulator is driven along a shaft 18 by a belt 19 attached to a motor 17. As the manipulator assembly 10 moves vertically upwards, the coil of cable 14 is stretched and when the manipulator assembly 10 moves downwards, the coil contracts due to the elastic nature of a coil configuration.

Figure 5:
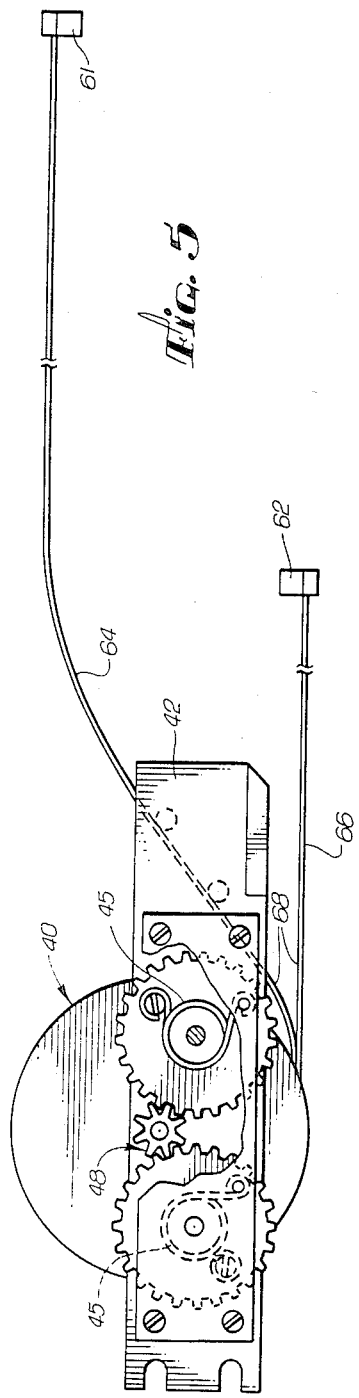
FIG. 5 is a side plan view, partially broken away, of the present invention.
Figure 6:
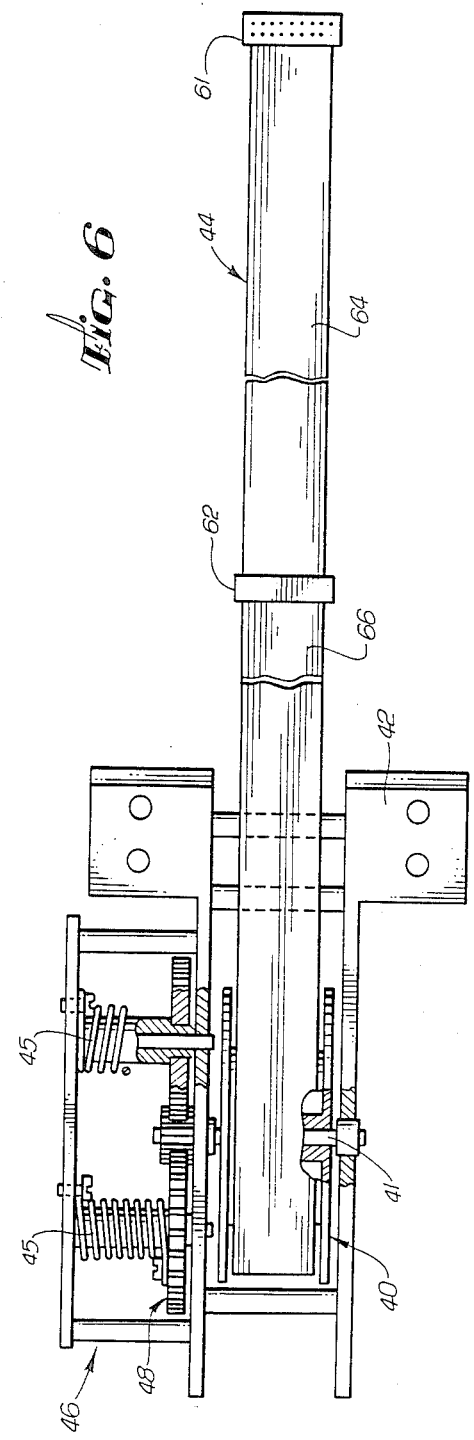
FIG. 6 is a bottom plan view of the present invention.
Figure 7:
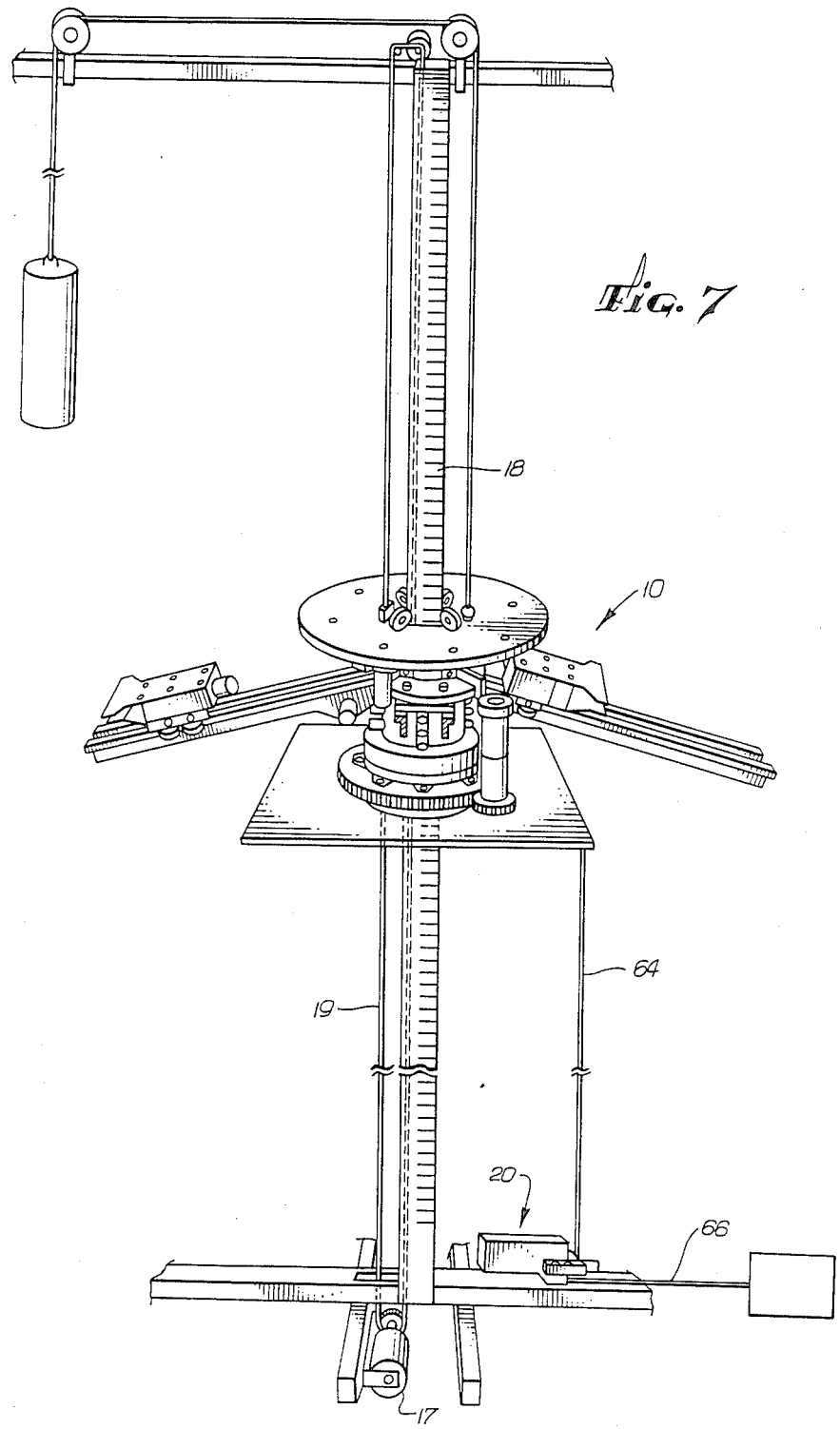
FIG. 7 is a front perspective diagramatic view of a manipulator assembly employing the cable retractor of the present invention.

Referring to FIGS. 2-7, the cable retractor of the present invention will be described. The overall structure of the cable retractor of the present invention is generally shown in FIG. 2, and its attachment with respect to the manipulator assembly is shown in FIG. 7. Generally, the assembly includes a spool assembly 40 rotatable on a shaft 41 (shown in FIG. 6) which is fixed to a frame 42. A cable assembly 44 which may comprise flat ribbon multiconductor type cable is wound onto the spool assembly. To facilitate rotation of the spool assembly 42, it is spring biased by torsion springs 45 (shown in FIGS. 3 and 6) of a retraction assembly 46 by way of a gear and pinion drive system 48. (The details of the cable assembly 44, the spool assembly 40 and the retraction assembly 46 are described later in detail by reference to FIGS. 3-6.) A cable housing 50 having a housing chamber 52 is attached to the frame such that an opening 54 at one and of the housing 50 is disposed to face the span of the spool assembly 40. The housing chamber 52 has an internal width which is slightly wider than the width of the cable assembly 44. A cable guide 56 and a cable separator 57 are affixed on the cable housing 50 adjacent to the spool assembly.

The spool assembly 40, the cable assembly 44 and the retraction assembly 46 are more clearly shown in FIGS. 4 to 6. As shown in FIG. 4, which is the cross-sectional view along Section A—A in FIG. 3, the spool assembly 40 comprises a hub 58 rotatable on the shaft 41. A standoff peg 59 having its axis parallel to the shaft 41 is provided within the hub 58. Also a strain relief 60 is provided adjacent to the standoff peg 59 within the hub.

Referring to FIG. 4, the cable assembly 44 comprises a continuous length of cable, which may be of the high flex type having multiple embedded conductors which is normally used in connection with digital electronic equipment. The cable is folded across its width at roughly mid-length at 63 to divide the cable into two portions, a first portion 64 adjacent a second portion 66, wherein both portions have their common continuous inside surface 68 coming into contact with one another. Connectors 61 and 62 are provided at the ends of the first and second portions respectively.

The cable assembly 44 is attached to the spool assembly 40 by looping the two portions of cable at the fold 63 around the standoff peg 59 within the hub 58. Both portions of cable are wrapped against the strain relief 60 and then wound onto the hub 58 of the spool assembly 40 to form alternate layers of first and second portions around the hub. The standoff peg 59 and the strain relief 60 prevent the cable from crimping.

The retraction assembly 46 includes two torsion springs 45 which are coupled to the spool assembly 40 via a gear and pinion assembly 48 as shown in FIGS. 5 and 6. The torsion springs 45 act on the spool assembly 40 so as to rotate the spool assembly 40 in a direction tending to wind the cable portions onto the hub 58. When the spool assembly 40 rotates in a direction opposite to the winding direction, that is, to unwind the cable portions, the torsion springs 45 are under tension to tend to rewind the cable portions.

FIG. 7 illustrates an application of the present invention wherein the cable retractor 20 of the present invention replaces the prior art coiled configuration 12 shown in FIG. 1 for taking up slack in a cable. The cable retractor 20 is installed at the base of the manipulator structure. The connector 61 at the end of the first portion 64 is connected to the mobile manipulator assembly 10. The second portion is clamped near its end to the frame at 70 (FIG. 2), thus restricting the movement of connector 62 at the end of the second portion 66. In operation, when the mobile member is being moved away from the spool, it pulls on the first portion 64 to cause the spool assembly 40 to rotate thereby to unwind at the same time both the first and second portion from the hub 58.

As the cable portions unwind from the spool, the cable separator 57 separates the adjacent portions of the unwound cable such that the first portion 64 extends to follow the movement of the mobile member and the second portion 66 is guided away from the flow of the first portion 64. The unwound second portion is further guided by the cable guide 56 into the cable housing chamber 52 through its opening 54. The unwound second portion is accommodated within chamber 52, as indicated by the long dashed lines 72 in FIG. 2, thereby to maintain electrical connection between the members while avoiding loose cable in the open.

Potential energy is accommulated in the torsion springs 45 as the spool assembly is caused to rotate against the action of the torsion springs to unwind the cable portions. At the same time, the springs impart a retraction force which acts on the unwound cable of the first portion 64 leading from the spool to the mobile member to tend to pull the unwound cable of the first portion 64 to maintain it in a taut condition.

When the mobile member is being moved closer towards the spool assembly 40, the accumulated energy in the torsion springs 45 causes the spool to rotate in the opposite rewinding direction thereby to take up by winding both the first and second portions of cable at the same time. The first portion is maintained in a taut condition at all times.

FIG. 8 shows an alternate embodiment of a cable assembly of the present invention. Instead of folding a continuous length of cable into two portions, the cable assembly of this embodiment comprises two separate lengths of cable 100 and 102 joined at one end of each length of cable by a coupler 104. The coupler 104 provides continuity from the conductors of one portion to the corresponding conductors of the other portion. Other than the difference in the way the first portion and the second portion are coupled, this embodiment shares the same structural features as the previous embodiment. The portions have their adjacent surfaces coming into contact with one another in a similar fashion as the cable assembly in the previous embodiment. The standoff peg 59 shown in FIG. 5 is not needed in this embodiment.

In this embodiment, the coupler 104 still provide a continuous cable connection between the mobile member and the stationary base member. In addition, this embodiment allows cables which cannot be folded into a tight loop around the peg to be used with the present invention.

It can therefore be seen that according to the present invention, there is provided a cable retractor assembly for application in connection with a mobile member. The present system maintains the cable connection between the mobile member and the stationary base member in a taut condition at all times and wherein there is no loose cable in the open. A cable retractor according to the present invention can be used in connection with conventional cables in the market.

The above is achieved by employing two portions of cable connected to one another. The two portions are wound on a spool together, therey both portions wind and unwind at the same time as the spool rotates. The second portion is accommodated in a chamber to avoid loose cable in the open.

While the invention has been described with respect to the prefered physical embodiment constructed in accordance therewith, it will be apparent to those skilled in the art that various modifications and improvements may be made without departing from the scope and spirit of the invention.

Accordingly, it is to be understood that the invention is not to be limited by the specific illustrative embodiment, but only by the scope of the appended claims.

I claim:

1. A cable retractor for taking up slack cable between a mobile member and a stationary base member, comprising:
    a frame;
    a shaft attached to the frame;
    a cable spool assembly having a hub rotatable about the shaft;
    a cable assembly comprising a first portion and a second portion of cable each having first and second ends, the portions being coupled together at the first end of each portion and both portions being wound together onto the hub of the spool assembly to provide alternate layers of first portion and second portion around the hub, the first portion having its second end connected to the mobile member and the second portion having its second end connected to the stationary base member;
    retraction means coupled to the spool assembly for providing retraction force for maintaining the first portion extending to the mobile member in a taut condition and for rotating the spool assembly, such that the spool assembly is caused to rotate in a first direction against the action of the retraction force as the first portion is unwound from the spool when the second end of the first portion is pulled by the mobile member as the mobile member is being moved away from the spool assembly, and the retraction force causes the spool assembly to rotate in a second direction opposite to the first direction to thereby rewind both portions onto the spool assembly when the mobile member is being moved towards the spool assembly; and
    a cable reservoir for collecting the second cable portion that is unwound as the first cable portion is unwound from the spool assembly.

2. A cable retractor according to claim 1, wherein the retraction means includes a torsion spring.

3. A cable retractor according to claim 2, wherein the retraction means further includes a gear and pinion assembly coupled between the torsion spring and the cable spool assembly.

4. A cable retractor for taking up slack cable between a mobile member and a stationary base member, comprising:
    a frame;
    a shaft attached to the frame;
    a cable spool assembly having a hub rotatable about the shaft;
    a cable assembly comprising first and second portions of cable each having first and second ends, wherein the first end of the first portion is coupled to the first end of the second portion, the second end of the first portion is connected to the mobile member and the second end of the second portion is connected to the stationary base member, and wherein the two portions are wound together onto the hub;
    retraction means coupled to the spool assembly for providing a retraction force for maintaining the first cable portion extending to the mobile member in a taut condition and for rotating the spool assembly in a direction to wind the two portions of cable; and
    a cable reservoir for collecting the second cable portion that is unwound at the first cable portion is unwound from the spool assembly.

5. A cable retractor according to claim 4 wherein the cable reservoir includes a housing assembly attached to the frame and a chamber within the housing assembly for collecting the unwound second cable portion.

6. A cable retractor according to claim 5 wherein the housing assembly includes a cable separation means disposed near the spool assembly for separating the adjacent surfaces of the first and second cable portions after both portions are unwound together from the spool assembly, and a cable guiding means disposed near the opening of the chamber of the cable reservoir for guiding the unwound second cable portion to be collected into the chamber.

7. A cable retractor according to claim 6 wherein the frame includes means for securing the second cable portion to the frame at a location along the second cable portion between the mobile member and the spool assembly, whereby the unwound second cable portion between the spool assembly and the secured location of the cable portion is collected into the cable reservoir.

8. A cable retractor according to claim 7 wherein the second cable portion has a thickness and a width and wherein the width is substantially larger than the thickness.

9. A cable retractor according to claim 8 wherein the chamber has an internal width substantially the same as the width of the second cable portion.

10. A cable retractor according to claim 9 wherein the cable portions include multiple conductors embedded within the portions.

11. A cable retractor according to claim 10, wherein the first portion and the second portion of the cable assembly are formed from one continuous cable, the cable being folded across its width at roughly mid-length to divide the cable into the two portions, the portions are coupled to the hub at the fold and then wound onto the hub.

12. A method of retracting slack cable between a mobile member and a stationary base member comprising the steps of:
dividing a cable into a first portion and a second portion each having first and second ends;
coupling the cable portions at the first end of each cable portion;
coupling the second end of the first cable portion to the mobile member;
coupling the second end of the second cable portion to the stationary base member;
winding the cable portions together onto a hub of a rotatable spool;
providing retraction force, while both cable portions unwind from the spool, for maintaining the first portion extending to the mobile member in a taut condition and for rotating the spool in a direction to wind the two cable portions; and
collecting the second cable portion that has been unwound as the first cable portion is unwound from the spool.

13. A method of retracting slack cable according to claim 12, wherein the first portion and the second portion of cable are provided by folding one continuous length of cable across its width at roughly mid-length to divide the cable into the two portions, and further coupling the folded cable onto the hub at the fold.

14. A system comprising:
a frame;
a mobile member movable along the frame;
a base member positioned in a stationary position with respect to the frame;
a rotatable cable spool assembly supported in a fixed position with respect to the base member;
a cable assembly comprising a first portion and a second portion of cable each having first and second ends, the portions being coupled together at the first end of each portion and both portions being wound together onto the spool assembly to provide alternate layers of first portion and second portion around the hub, the first portion having its second end connected to the mobile member and the second portion having its second end connected to the stationary base member;
retraction means coupled to the spool assembly for providing retraction force for maintaining the first portion extending to the mobile member in a taut condition and for rotating the spool assembly, such that the spool assembly is caused to rotate in a first direction against the action of the retraction force as the first portion is unwound from the spool when the second end of the first portion is pulled by the mobile member as the mobile member is moved away from the spool assembly, and the retraction force causes the spool assembly to rotate in a second direction opposite to the first direction to thereby rewind both portions onto the spool assembly when the mobile member is being moved towards the spool assembly; and
a cable reservoir for collecting the second cable portion that is unwound as the first cable portion is unwound from the spool assembly.

15. A system comprising:
a frame;
a mobile member movable with respect to the frame;
a base member stationary with respect to the frame;
a rotatable cable spool assembly supported in a fixed position with respect to the frame;
a cable assembly comprising first and second portions of cable each having first and second ends, wherein the first end of the first portion is coupled to the first end of the second portion, the second end of the first portion is connected to the mobile member and the second end of the second portion is connected to the stationary base member, and wherein the two portions are wound together onto the spool assembly;
retraction means coupled to the spool assembly for providing a retraction force for maintaining the first cable portion extending to the mobile member in a taut condition and for rotating the spool assembly in a direction to wind the two portions of cable; and
a cable reservoir for collecting the second cable portion that is unwound as the first cable portion is unwound from the spool assembly.

* * * * *